United States Patent
Shem Tov et al.

(10) Patent No.: US 12,518,018 B2
(45) Date of Patent: Jan. 6, 2026

(54) MANAGING CONNECTION SECURITY OF STORAGE ARRAYS

(71) Applicant: Dell Products L.P., Round Rock, TX (US)

(72) Inventors: Marina Shem Tov, Hod Hasharon (IL); Eldad Zinger, Raanana (IL); Rivka Matosevich, Zichron Ya'acov (IL)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/625,546

(22) Filed: Apr. 3, 2024

(65) Prior Publication Data
US 2025/0315530 A1    Oct. 9, 2025

(51) Int. Cl.
H04L 29/06    (2006.01)
G06F 21/44    (2013.01)
G06F 21/57    (2013.01)

(52) U.S. Cl.
CPC .............. *G06F 21/57* (2013.01); *G06F 21/44* (2013.01); *G06F 2221/034* (2013.01)

(58) Field of Classification Search
CPC ...................................................... G06F 21/57
See application file for complete search history.

(56) References Cited

U.S. PATENT DOCUMENTS

| | | | |
|---|---|---|---|
| 8,086,760 B1 | 12/2011 | Gruttadauria et al. | |
| 10,706,156 B2 * | 7/2020 | Bhalla | G06F 21/577 |
| 11,475,171 B2 | 10/2022 | Levy et al. | |
| 11,651,066 B2 | 5/2023 | Levi et al. | |
| 11,728,998 B2 | 8/2023 | Salamon et al. | |
| 2021/0044623 A1 * | 2/2021 | Bosch | G06F 21/575 |
| 2024/0297887 A1 * | 9/2024 | Miel | H04L 63/0876 |

\* cited by examiner

*Primary Examiner* — Jason K Gee
(74) *Attorney, Agent, or Firm* — BainwoodHuang

(57) ABSTRACT

A technique is directed to managing connection security of a storage array. The technique includes provisioning the storage array with capabilities to: implement an updated security requirement and terminate an active session between the storage array and a host device in response to the active session being unable to satisfy the updated security requirement, implement the updated security requirement and maintain the active session even though the active session is unable to satisfy the updated security requirement, and decline implementing the updated security requirement and maintain the active session in response to the active session being unable to satisfy the updated security requirement. The technique further includes, after the storage array has been provisioned with the capabilities, receiving a security policy selection which identifies one of the capabilities. The technique further includes applying one of the capabilities to the storage array based on the security policy selection.

19 Claims, 5 Drawing Sheets

MANAGING CONNECTION SECURITY OF STORAGE ARRAYS

BACKGROUND

A conventional data storage system manages data on behalf of clients. Along these lines, the conventional data storage system implements security measures to restrict access to the data.

For example, prior to allowing a client to access the data, the conventional data storage system exchanges messages with the client to verify the client's identity. Once the conventional data storage system verifies the client's identity, the conventional data storage system allows the client to access to the data until the client disconnects.

SUMMARY

Unfortunately, there are deficiencies in the manner in which the above-described conventional data storage system manages connections with clients. Along these lines, suppose that an administrator of the conventional data storage system wishes to implement more stringent verification settings while the conventional data storage system already has an established connection with a client. In this situation, the conventional data storage system maintains the established connection even if the established connection would not be in compliance with the more stringent verification settings.

Such an approach has numerous deficiencies. For example, this approach limits the administrator's options to "gain back" security of the conventional data storage system. That is, under the conventional approach, the administrator does not have an option of enhancing verification requirements to disconnect potentially malicious clients. In this manner, the conventional approach lacks flexibility to choose alternate policies based on a desired amount of security.

Further, the conventional approach creates potential security holes. Along these lines, under the conventional approach, the administrator lacks visibility as to whether established connections would comply with the enhanced verification settings. Thus, the conventional approach increases a risk that the administrator overlooks a malicious client that remains connected even after the conventional data storage system implements the enhanced verification settings.

Even further, the conventional approach creates a risk of data unavailability. Along these lines, under the conventional approach, if the administrator incorrectly believes that a connected client is able to comply with the enhanced verification settings, a disconnection (e.g., a reboot of the client or a temporary network outage) would result in the client being unable to reconnect with the data storage array. In this manner, the conventional approach lacks safeguards to prevent the conventional data storage system from implementing the enhanced verification settings in situations in which an established connection would not comply.

In contrast to the above-described conventional data storage system, improved techniques are directed to managing connection security of a storage array after receiving an instruction to implement an updated security requirement. In some arrangements, the storage array is configured with multiple user-selectable capabilities that address different security and/or connectivity concerns. Along these lines, if an active session between the storage array and a host device is unable to satisfy the updated security requirement, the storage array applies one of the capabilities based on a user selection. Under one capability, the storage array implements the updated security requirement and terminates the active session. Under another capability, the storage array implements the updated security requirement while maintaining the active session. Under yet another capability, the storage array declines to implement the updated security requirement. Accordingly, the user maintains control over security of the storage array and connections with the storage array.

One embodiment is directed to a method of managing connection security of a storage array. The method includes provisioning the storage array with capabilities to:
  (i) implement an updated security requirement and terminate an active session between the storage array and a host device in response to the active session being unable to satisfy the updated security requirement,
  (ii) implement the updated security requirement and maintain the active session even though the active session is unable to satisfy the updated security requirement, and
  (iii) decline implementing the updated security requirement and maintain the active session in response to the active session being unable to satisfy the updated security requirement.

The method further includes, after the storage array has been provisioned with the capabilities, receiving a security policy selection which identifies one of the capabilities. The method further includes applying one of the capabilities to the storage array based on the security policy selection.

Another embodiment is directed to an electronic environment that includes a memory and control circuitry coupled with the memory. The memory stores instructions that, when carried out by the control circuitry, cause the control circuitry to perform a method of managing connection security of a storage array, the method including:
  (A) provisioning the storage array with capabilities to:
    (i) implement an updated security requirement and terminate an active session between the storage array and a host device in response to the active session being unable to satisfy the updated security requirement,
    (ii) implement the updated security requirement and maintain the active session even though the active session is unable to satisfy the updated security requirement, and
    (iii) decline implementing the updated security requirement and maintain the active session in response to the active session being unable to satisfy the updated security requirement;
  (B) after the storage array has been provisioned with the capabilities, receiving a security policy selection which identifies one of the capabilities; and
  (C) applying one of the capabilities to the storage array based on the security policy selection.

Yet another embodiment is directed to a computer program product having a non-transitory computer readable medium that stores a set of instructions to manage connection security of a storage array. The set of instructions, when carried out by computerized circuitry, causes the computerized circuitry to perform a method of:
  (A) provisioning the storage array with capabilities to:
    (i) implement an updated security requirement and terminate an active session between the storage array and a host device in response to the active session being unable to satisfy the updated security requirement, (ii) implement the updated security requirement and maintain the active session even though the active session is unable to satisfy the updated security requirement, and (iii) decline implementing the updated security requirement and maintain the active session in response to the active session being unable to satisfy the updated security requirement;

(B) after the storage array has been provisioned with the capabilities, receiving a security policy selection which identifies one of the capabilities; and (C) applying one of the capabilities to the storage array based on the security policy selection.

In some arrangements, the method further includes receiving an instruction to implement the updated security requirement, the instruction providing a set of authentication parameters to authenticate new sessions of the storage array. The method further includes, after receiving the instruction to implement the updated security requirement, performing a compliance operation that indicates whether the active session was authenticated in compliance with the set of authentication parameters. Additionally, applying one of the capabilities is in response to the compliance operation indicating that the active session was not authenticated in compliance with the set of authentication parameters.

In some arrangements, the set of authentication parameters includes a set of hash functions to perform authentication according to a hash-based message authentication protocol. Additionally, performing the compliance operation includes confirming whether the host device supports authentication according to the hash-based message authentication protocol using at least one hash function from the set of hash functions.

In some arrangements, the set of authentication parameters includes a set of Diffie-Hellman (DH) groups to perform authentication according to a DH-hash-based message authentication code-challenge-handshake authentication protocol (DH-HMAC-CHAP). Additionally, performing the compliance operation includes confirming whether the host device supports authentication according to the DH-HMAC-CHAP using at least one DH group from the set of DH groups.

In some arrangements, receiving the instruction to implement the updated security requirement includes receiving an instruction to modify an existing secret key that was used to authorize the active session.

In some arrangements, receiving the instruction to implement the updated security requirement includes, after the storage array has established the active session with the host device, receiving an instruction to modify an authentication policy of the storage array to require authentication of new sessions with the storage array.

In some arrangements, applying one of the capabilities includes applying a first capability in which the storage array implements the updated security requirement while maintaining the active session. Additionally, the method further includes:

(A) after applying the first capability, receiving an updated security policy selection that identifies a second capability in which the storage array is configured to terminate the active session for failing to comply with the updated security requirement; and (B) in response to receiving the updated security policy selection, terminating the active session for failing to comply with the updated security requirement.

In some arrangements, receiving the security policy selection includes receiving, as the security policy selection, a default selection that identifies a capability in which the storage array implements the updated security requirement and terminates the active session in response to the active session being unable to satisfy the updated security requirement.

In some arrangements, the method further includes:

(A) after receiving the security policy selection, providing a graphical interface constructed and arranged to identify the active session as being unable to satisfy the updated security requirement; and (B) after providing the graphical interface, receiving a confirmation to proceed with applying one of the capabilities based on the security policy selection.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

An improved technique is directed to managing connection security of a storage array after receiving an instruction to implement an updated security requirement. In some arrangements, the storage array is configured with a variety of selectable capabilities to address a range of security and/or connectivity concerns. Along these lines, when an active session between the storage array and a host device is unable to satisfy the updated security requirement, the storage array applies one of the capabilities based on a security policy selection. Under one capability, the storage array implements the updated security requirement and terminates the active session. Under another capability, the storage array implements the updated security requirement but maintains the active session. Under yet another capability, the storage array declines implementing the updated security requirement and maintains the active session.

Accordingly, a user has control over security of the storage array and connections with the storage array.

Figure 1:
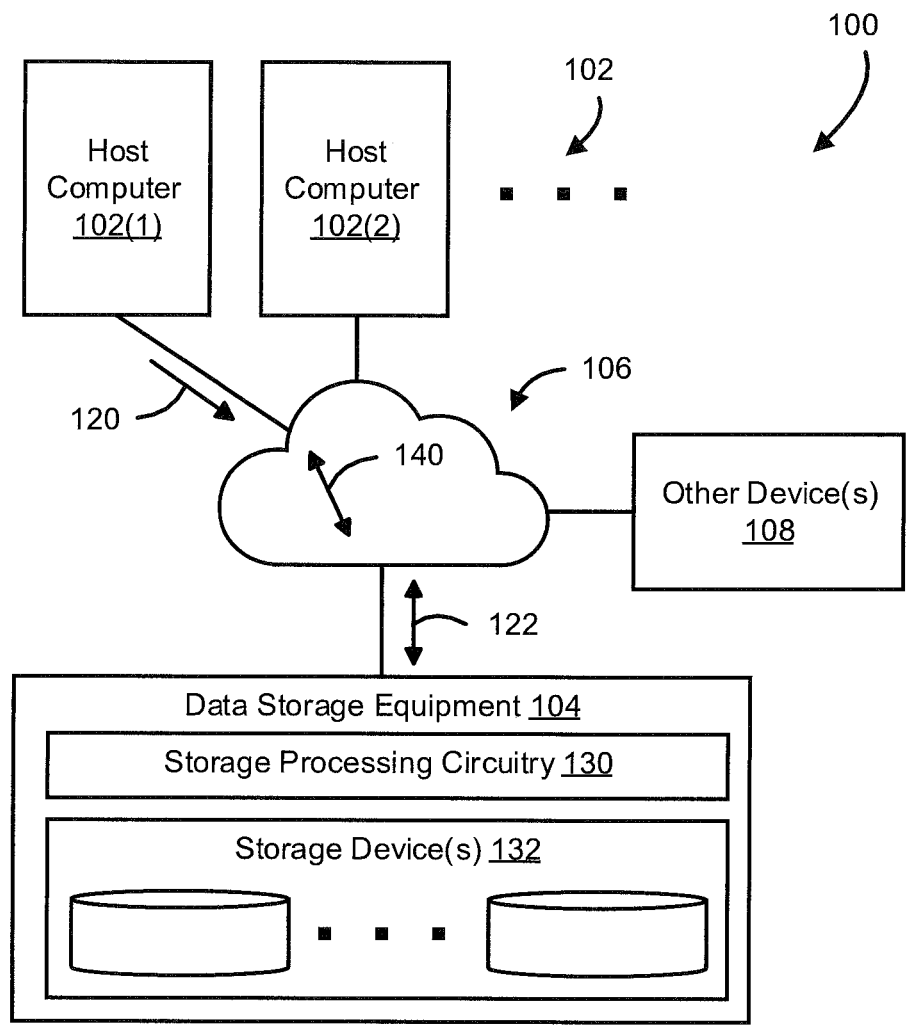
FIG. 1 is a block diagram of an example environment in accordance with certain embodiments.

FIG. 1 shows an example electronic environment 100 that manages connection security in accordance with certain embodiments. The electronic environment 100 includes host computers 102(1), 102(2), . . . (collectively, host computers 102), a storage array 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) includes storage processing circuitry 130 and a set of storage devices 132. In some embodiments, the storage processing circuitry 130 includes one or more physical storage processors (SPs) or engines, data movers, director boards, blades, I/O modules, storage device controllers, switches, other hardware, combinations thereof, and so on.

In some embodiments, the storage processing circuitry 130 is constructed and arranged to respond to the host I/O requests 120 from the host computers 102 by writing data into and reading the data from the set of storage devices 132. Along these lines, in some embodiments, the storage processing circuitry 130 is constructed and arranged communicate with the host computers 102 over one or more transport sessions (or simply "sessions").

In some embodiments, the storage processing circuitry 130 is constructed and arranged to establish sessions according to a non-volatile memory express transmission control protocol (NVMe/TCP). However, it should be understood that NVMe/TCP is provided for example purposes, and some embodiments use a different transport protocol (e.g., Ethernet/IP, FC-NVMe, etc.).

In some embodiments, the storage processing circuitry 130 is constructed and arranged to implement one or more security requirements, e.g., to restrict access to the data stored on the set of storage devices 132. Along these lines, in some embodiments, the storage processing circuitry 130 is constructed and arranged to authenticate sessions between the data storage equipment 104 and the host computers 102. In some embodiments, authenticating a session (or simply "authentication") refers to establishing a trusted connection between the data storage equipment 104 and a particular host computer (e.g., by validating one or more credentials of the particular host computer). In some embodiments, the storage processing circuitry 130 is constructed and arranged to authenticate the sessions prior to queuing and servicing the host I/O requests 120.

In some embodiments, the storage processing circuitry 130 is constructed and arranged to perform NVMe over fabrics (NVMe-oF) in-band authentication according to a Diffie-Hellman-hash-based message authentication code-challenge-handshake authentication protocol (DH-HMAC-CHAP). However, it should be understood that such authentication is provided for example purposes, and in some embodiments, other types of authentication and/or authentication protocols are suitable (e.g., CHAP, etc.).

In some embodiments, the storage processing circuitry 130 is constructed and arranged to provision the data storage equipment 104 with multiple selectable capabilities, e.g., to address different security and/or connectivity concerns. Along these lines, in some embodiments, the multiple capabilities include a first capability in which the data storage equipment 104 implements an updated security requirement and terminates an active (or in-use) session between the storage array and a host device in response to the active session being unable to satisfy the updated security requirement. In some embodiments, the multiple capabilities include a second capability in which the data storage equipment 104 implements the updated security requirement and maintain the active session even though the active session is unable to satisfy the updated security requirement. In some embodiments, the multiple capabilities include a third capability in which the data storage equipment 104 declines to implement the updated security requirement and maintains the active session in response to the active session being unable to satisfy the updated security requirement.

In some embodiments, the storage processing circuitry 130 is constructed and arranged to receive a security policy selection that identifies one of the capabilities. In some embodiments, the storage processing circuitry 130 receives the security policy selection from a user (e.g., an administrator of the data storage equipment 104, etc.). In some embodiments, the security policy selection is per-session selection. However, in some embodiments, the security policy selection is a global selection (e.g., applying to multiple active sessions with the data storage equipment 104).

In some embodiments, the storage processing circuitry 130 is constructed and arranged to receive the security policy selection as a default selection. In some embodiments, the default selection identifies a capability in which the data storage equipment 104 implements the updated security requirement and terminates the active session in response to the active session being unable to satisfy the updated security requirement.

In some embodiments, the storage processing circuitry 130 is constructed and arranged to apply one of the capabilities based on the security policy selection. That is, in some embodiments, the storage processing circuitry 130 is constructed and arranged to apply a capability that the security policy selection identifies.

The set of storage devices 132 is constructed and arranged to provide persistent/non-volatile storage in accordance with one or more RAID data protection schemes. In some embodiments, the set of storage devices 132 includes one or more types of storage drives, e.g., non-volatile random access memory (NVRAM) devices, solid state drives (SSDs), hard disk drives (HDDs), combinations thereof, and so on. In some embodiments, at least some devices of the set of storage devices 132 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the electronic environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

In some embodiments, the communications medium 106 is constructed and arranged to richly and reliably transmit the electronic signals 140 according to NVMe/TCP. However, it should be understood that NVMe/TCP is provided for example purposes, and some embodiments use a different transport protocol (e.g., Ethernet/IP, FC-NVMe, etc.).

The other devices 108 represent other possible componentry of the electronic environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During an example operation and as will be explained in further detail shortly, the storage processing circuitry 130 provisions the data storage equipment 104 with the various capabilities and receives the security policy selection that identifies one of the capabilities. Later, when the storage processing circuitry 130 receives an instruction to implement an updated security requirement, the storage processing circuitry 130 identifies whether an active (or in-use) session between the data storage equipment 104 and one of the host computers 102 is able to satisfy the updated security requirement. If not, then the storage processing circuitry 130 applies one of the capabilities based on the security policy selection. In this manner, the storage processing circuitry 130 richly and robustly manages connection security of the data storage equipment 104. Further details will now be provided with reference to FIG. 2.

Figure 2:
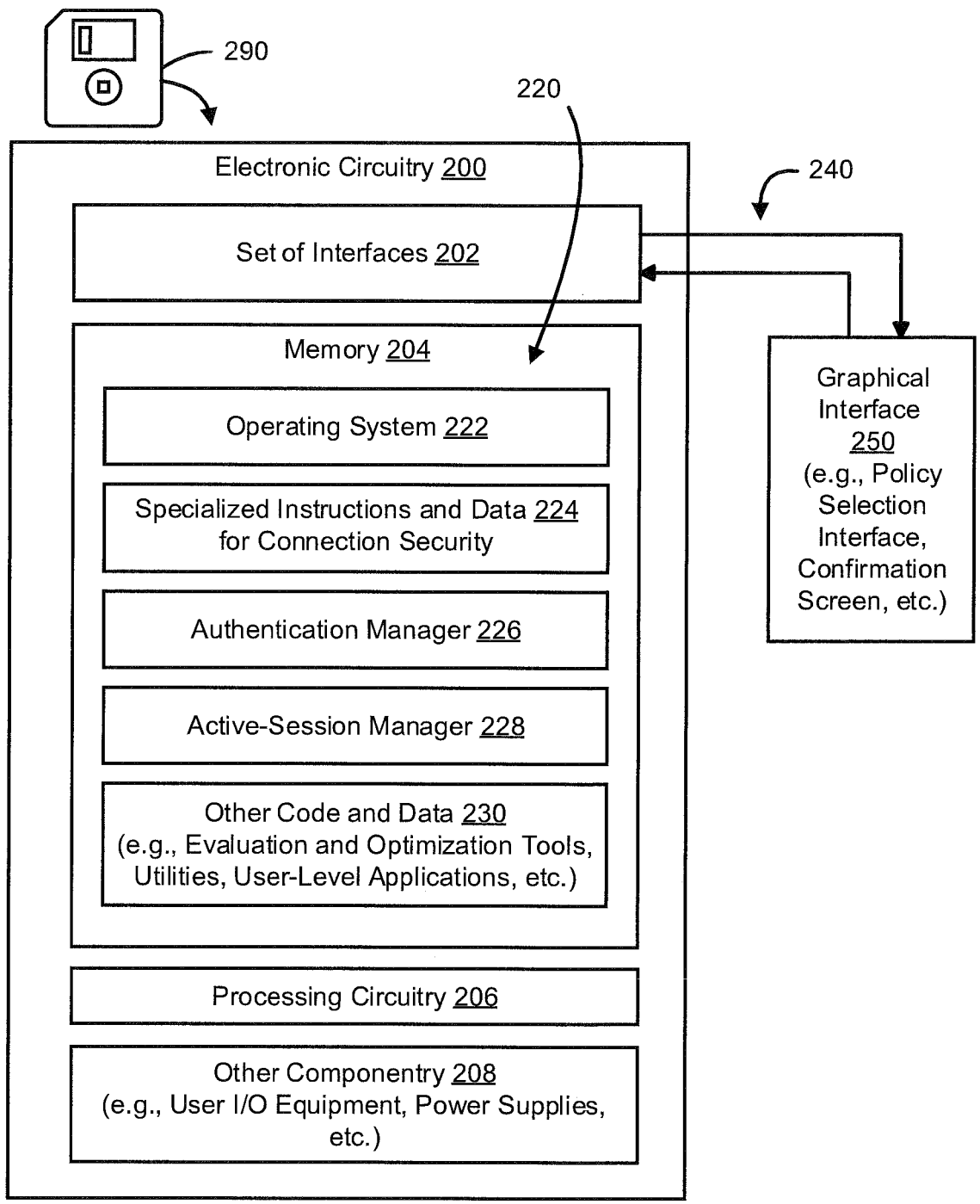
FIG. 2 is a block diagram of electronic circuitry in accordance with certain embodiments.

FIG. 2 is a block diagram of electronic circuitry 200 which is suitable for at least a portion of the data storage equipment 104 (FIG. 1) in accordance with certain embodiments. The electronic circuitry 200 includes a set of interfaces 202, memory 204, processing circuitry 206, and other componentry 208.

The set of interfaces 202 is constructed and arranged to connect the electronic circuitry 200 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 202 is constructed and arranged to connect the electronic circuitry 200 to other local equipment such as the first set of storage devices 132 and the second set of storage devices 134. In some embodiments, the set of interfaces 202 includes one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

In some embodiments and as will be explained in further detail shortly, the set of interfaces 202 is constructed and arranged to exchanges signals 240 with a graphical interface 250. In some embodiments, the graphical interface 250 is part of (or connected with) one of the host computers 102 (e.g., host computer 102(1)).

In some embodiments, the graphical interface 250 is a user interface constructed and arranged to receive input from a user. For example, in some embodiments, the graphical interface 250 is constructed and arranged to transmit one or more selections and/or instructions to the electronic equipment 200. Along these lines, in some embodiments, the graphical interface 250 is constructed and arranged to transmit an instruction to implement an updated security requirement of the data storage equipment 104 (e.g., a new or updated authentication requirement, etc.). In some embodiments, the graphical interface 250 is constructed and arranged to transmit a security policy selection that manages an active session between the data storage equipment 104 and one of the host computers 102.

In some embodiments, the graphical interface 250 is constructed and arranged to display an output from the electronic circuitry 200. Along these lines, in some embodiments, after transmitting an instruction to implement an updated security requirement, the graphical interface 250 is constructed and arranged to provide a notification of a conflict between the updated security requirement and an active session. In some embodiments, the notification includes multiple selectable options, e.g., a first option to proceed with implementing the updated security requirement even though the active session would not comply, a second option to cancel implementing the updated security requirement, combinations thereof, etc. In this manner, the user is informed of potential conflicts and is able to make an informed choice whether to adjust security requirements of the data storage equipment 104. In some embodiments, the options are selectable on a per-session basis, on a global basis, etc.

It should be understood that the graphical interface 250 is provided for example purposes, and in some embodiments, the graphical interface 250 is provided as a command-line interface, text-based interface, combinations thereof, etc.

The memory 204 includes both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, an authentication policy manager 226, an active-session policy manager 228, and other code and data 230.

The operating system 222 refers to particular control code such as a kernel to manage computerized resources (e.g., processor cycles, memory space, etc.), the I/O stack (e.g., drivers), and so on. The specialized instructions and data 224 refer to particular instructions for storage management. In some arrangements, the specialized instructions and data 224 are tightly integrated with or part of the operating system 222 itself.

The authentication manager 226 is constructed and arranged to authenticate sessions between the data storage equipment 104 and the host computers 102. In some embodiments, the authentication manager 226 is constructed and arranged performs authentication according to a set of authentication parameters. In some embodiments, the set of authentication parameters are selected by a user (e.g., through the graphical interface 250), by default, combinations thereof, etc.).

In some embodiments, the set of authentication parameters identify a particular operational setting (e.g., an authentication-disabled setting, an authentication-permitted setting, an authentication-required setting, etc.). Along these lines, in some embodiments, the authentication-disabled setting refers to a configuration in which authentication of a remote entity is not allowed. In some embodiments, the authentication-permitted setting refers to a configuration in which authentication of a remote entity is allowed (but not required). In some embodiments, the authentication-required setting refers to a configuration in which authentication of a remote entity is required.

In some embodiments, the authentication manager 226 is constructed and arranged to perform authentication according to a hash-based message authentication protocol (e.g., DH-HMAC-CHAP, CHAP, etc.). As explained in greater detail below, when performing authentication according to a hash-based message authentication protocol, the entities in the session (e.g., the data storage equipment 104 and one of the host computers 102) use a particular agreed-upon hash function to encrypt data during authentication. Accordingly, in some embodiments, the set of authentication parameters includes a list of supported hash functions that the data storage equipment 104 is able to use to authenticate a session. Example hash functions include SHA-256, SHA-384, SHA-512, etc. However, it should be understood that these hash functions are provided for example purposes, and in some embodiments, the list of supported hash functions include more or fewer hash functions.

In some embodiments, the authentication manager 226 is constructed and arranged to perform authentication according to DH-HMAC-CHAP. As explained in greater detail below, when performing authentication according to DH-HMAC-CHAP, the entities in the session use a particular agreed-upon DH group (e.g., a shared cryptographic protocol to calculate a response to an authentication challenge). Accordingly, in some embodiments, the set of authentication parameters includes a list of supported DH groups that the data storage equipment 104 is able to use to authenticate a session. Example DH groups include Null DH, 2048-bit, 3072-bit, 4096-bit, 6144-bit, 8192-bit, etc. However, it should be understood that these DH groups are provided for example purposes, and in some embodiments, the list of supported DH groups includes more or fewer DH groups.

In some embodiments, the authentication manager 226 is constructed and arranged to perform authentication using a set of secret keys (e.g., a DH-HMAC-CHAP secret key for the data storage equipment 104 and separate secret verification keys for each remote entity that is authenticated).

In some embodiments, the authentication manager 226 is constructed and arranged to perform a compliance operation that indicates whether an active session would comply with an updated security requirement. In some embodiments, the updated security requirement provides an updated set of authentication parameters, and the compliance operation indicates whether the active session was authenticated in compliance with the updated set of authentication parameters.

It should be understood that it is possible that an active session was authenticated in compliance with an updated set of authentication parameters even though the active session was authenticated under an older set of authentication parameters. For example, suppose that the active session was established using the SHA-256 hash function. If the updated set of authentication parameters still includes the SHA-256 hash function in an updated list of supported hash functions, then the active session was established in compliance with the updated list of supported hash functions.

In some embodiments, the authentication manager 226 is constructed and arranged to implement an updated security requirement according to a security policy selection. In some embodiments, the updated security requirement includes a modification to (or an addition of) one or more authentication parameters (e.g., the operational setting, the list of supported hash functions, the list of supported DH groups, the DH-HMAC-CHAP secret key, combinations thereof, etc.).

In some embodiments, the authentication manager 226 is constructed and arranged to decline to implement the updated security requirement according to a security policy selection. For example, in some embodiments, the security policy selection directs the authentication manager 226 to decline implementing the updated security policy requirement when an active session would not comply with the updated security policy selection.

The active-session manager 228 is constructed and arranged to manage one or more active sessions with the data storage equipment 104. Along these lines, in some embodiments, the active-session manager 228 is constructed and arranged to terminate an active session according to a security policy selection. For example, in some embodiments, the security policy selection directs the active-session manager 228 to terminate the active session if it does not comply with an updated security requirement being implemented.

In some embodiments, the active-session manager 228 is constructed and arranged to maintain (or decline to terminate) an active session according to a security policy selection. For example, in some embodiments, the active-session manager 228 maintains the active session even though the active session is unable to comply with the updated security requirement.

The other code and data 236 include applications and routines to provide additional operations and services (e.g., performance measurement tools, etc.), user-level applications, administrative tools, utilities, and so on.

During an example operation, in some embodiments, after provisioning the data storage equipment 104 with multiple capabilities, the electronic circuitry 200 receives a security policy selection identifying one of the capabilities. In some embodiments, a user provides the security policy selection (e.g., through one of the host computers 102, the graphical interface 250, combinations thereof, etc.).

Thereafter, in some embodiments, the electronic circuitry 200 receives an instruction to implement an updated security requirement of the data storage equipment 104. In some embodiments, the updated security requirement provides an updated set of authentication parameters. In some embodiments, a user provides the instruction to implement the updated security requirement (e.g., through one of the host computers 102, the graphical interface 250, combinations thereof, etc.).

In response, the authentication manager 226 performs the compliance operation which indicates whether an active session is able to comply with the updated security requirement (e.g., whether the active session was authenticated in compliance with the updated set of authentication parameters). If not, then the authentication manager 226 and the active-session manager 228 follow the security policy selection (e.g., to implement or decline to implement the updated security requirement and maintain or terminate the active session). In this manner, the data storage equipment 104 is configured to flexibly address a wide range of security and/or connectivity concerns. Further details will now be provided with reference to FIG. 3.

Figure 3:
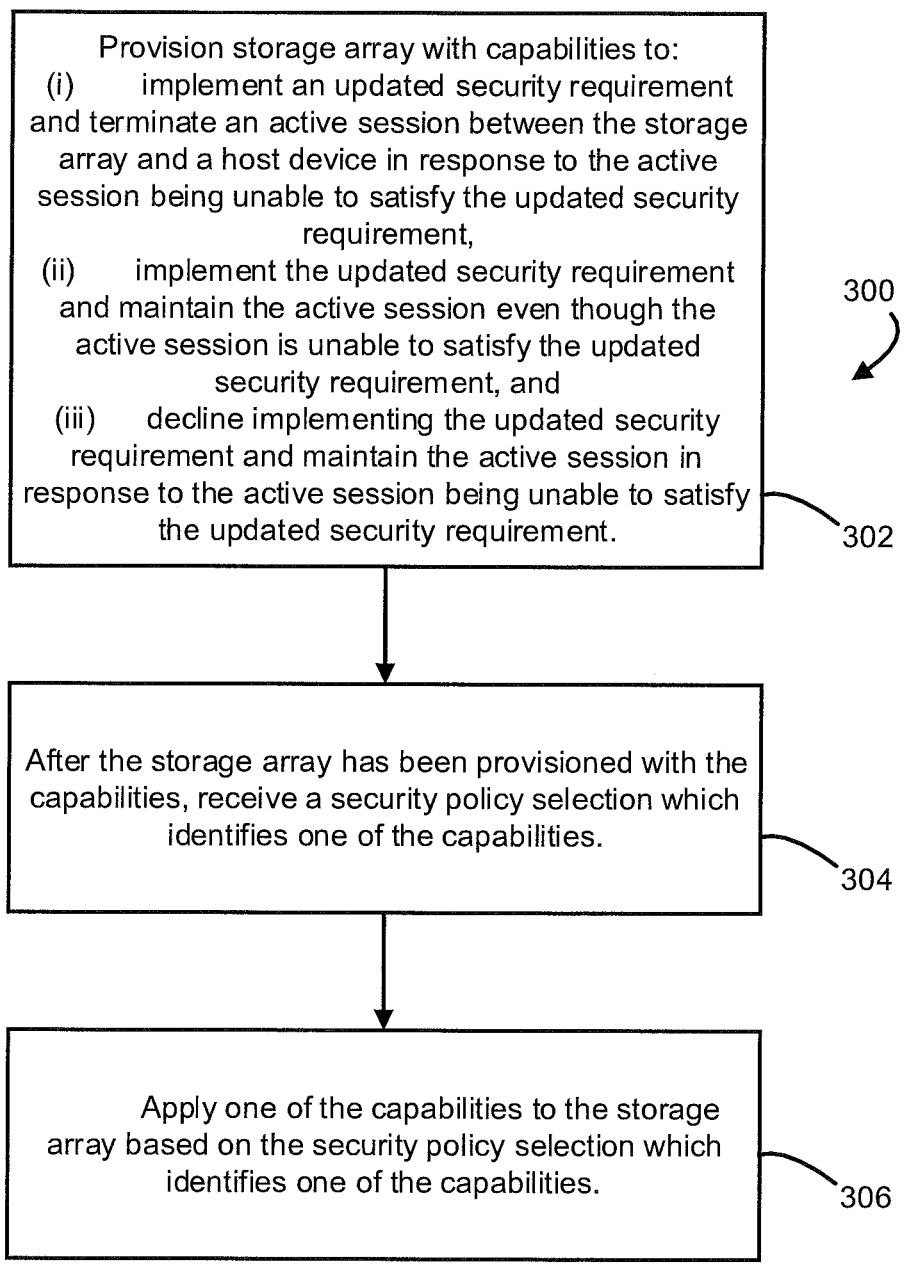
FIG. 3 is a flowchart of a procedure to manage connection security which is performed by specialized equipment in accordance with certain embodiments.

FIG. 3 is a flowchart of a procedure 300 which is performed by specialized equipment in accordance with certain embodiments. The procedure 300 carries out management of connection security of the data storage equipment 104 (FIG. 1).

At 302, the storage processing circuitry 130 provisions the data storage equipment 104 with the multiple capabilities. The multiple capabilities include a first capability in which the data storage equipment 104 implements an updated security requirement and terminates an active (or in-use) session between the storage array and a host device in response to the active session being unable to satisfy the updated security requirement. Further, the multiple capabilities include a second capability in which the data storage equipment 104 implements the updated security requirement and maintain the active session even though the active session is unable to satisfy the updated security requirement. Even further, the multiple capabilities include a third capability in which the data storage equipment 104 declines to implement the updated security requirement and maintains the active session in response to the active session being unable to satisfy the updated security requirement.

At 304, after the storage processing circuitry has provisioned the data storage equipment 104 with the capabilities, the data storage equipment 104 receives a security policy selection which identifies one of the capabilities. In some embodiments, the security policy selection is a user-defined selection, a default selection, etc.

At 306, the data storage equipment 104 applies one of the capabilities to the storage array based on the security policy selection. In some embodiments, the data storage equipment 104 applies one of the capabilities after receiving an instruction to apply the updated security requirement and after performing a compliance operation that indicates that the active session does not comply with the updated security requirement. In this manner, the data storage equipment 104 gives control to a user over security of and connectivity with the data storage equipment 104. Further details will now be provided with reference to FIG. 4.

Figure 4:
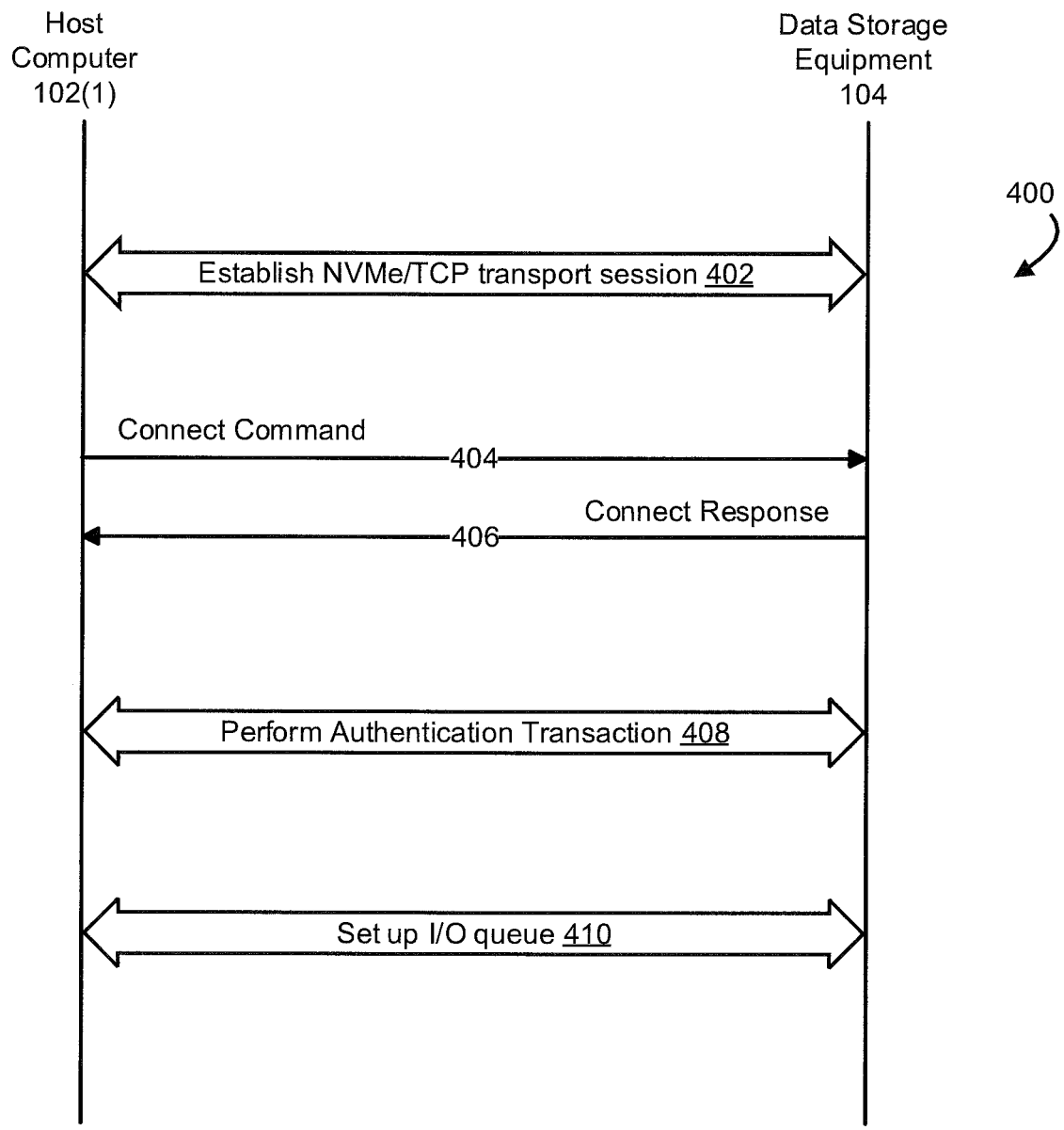
FIG. 4 shows a flowchart of a procedure to establish an authenticated session in accordance with certain embodiments.

FIG. 4 shows a flowchart of a procedure 400 which is performed by specialized equipment in accordance with certain embodiments. The procedure 400 carries out an initial setup of a session between the host computer 102(1) and the data storage equipment 104 according to NVMe/TCP. It should be understood that NVMe/TCP is provided for example purposes, in some embodiments, other transports protocols are suitable (e.g., Ethernet/IP, FC-NVMe, etc.).

At 402, the host computer 102(1) and the data storage equipment 104 establish an NVMe/TCP transport session.

At 404 and 406, the host computer 102(1) and the data storage equipment 104 perform a connect exchange operation to set up an NVMe queue and to associate the host computer 102(1) to the data storage equipment 104. Along these lines, at 404, the host computer 102(1) sends a connect command to the data storage equipment 104. Then, at 406, the data storage equipment 104 sends a connect response to the host computer 102(1). In some embodiments, the connect response indicates an authentication requirement to the host computer 102(1). For example, in some embodiments, the data storage equipment 104 requires NVMe in-band authentication. It should be understood that NVMe in-band authentication is provided for example purposes, and in some embodiments, another type of authentication is required.

At 408, the host computer 102(1) and the data storage equipment 104 perform an authentication transaction to establish a trusted connection between the host computer 102(1) and the data storage equipment 104. In some embodiments and as explained in greater detail below, the authentication transaction authenticates end-points of the connection (e.g., the host computer 102(1) and the data storage equipment 104). Along these lines, in some embodiments, the authentication transaction includes an authentication-send command and an authentication-receive command to tunnel authentication protocol commands between the host computer 102(1) and the data storage equipment 104.

At 410, after the authentication transaction is successful, the host computer 102(1) and the data storage equipment 104 set up an input/output (I/O) queue to receive subsequent operations. In some embodiments, the host computer 102(1) is constructed and arranged to insert the host I/O requests 120 into the I/O queue, and the data storage equipment 104 is constructed and arranged to service the host I/O request 120. In this manner, the data storage equipment 104 is configured to richly and reliably store host data 122 within and retrieve the host data 122 from storage. Further details will now be provided with reference to FIG. 5.

Figure 5:
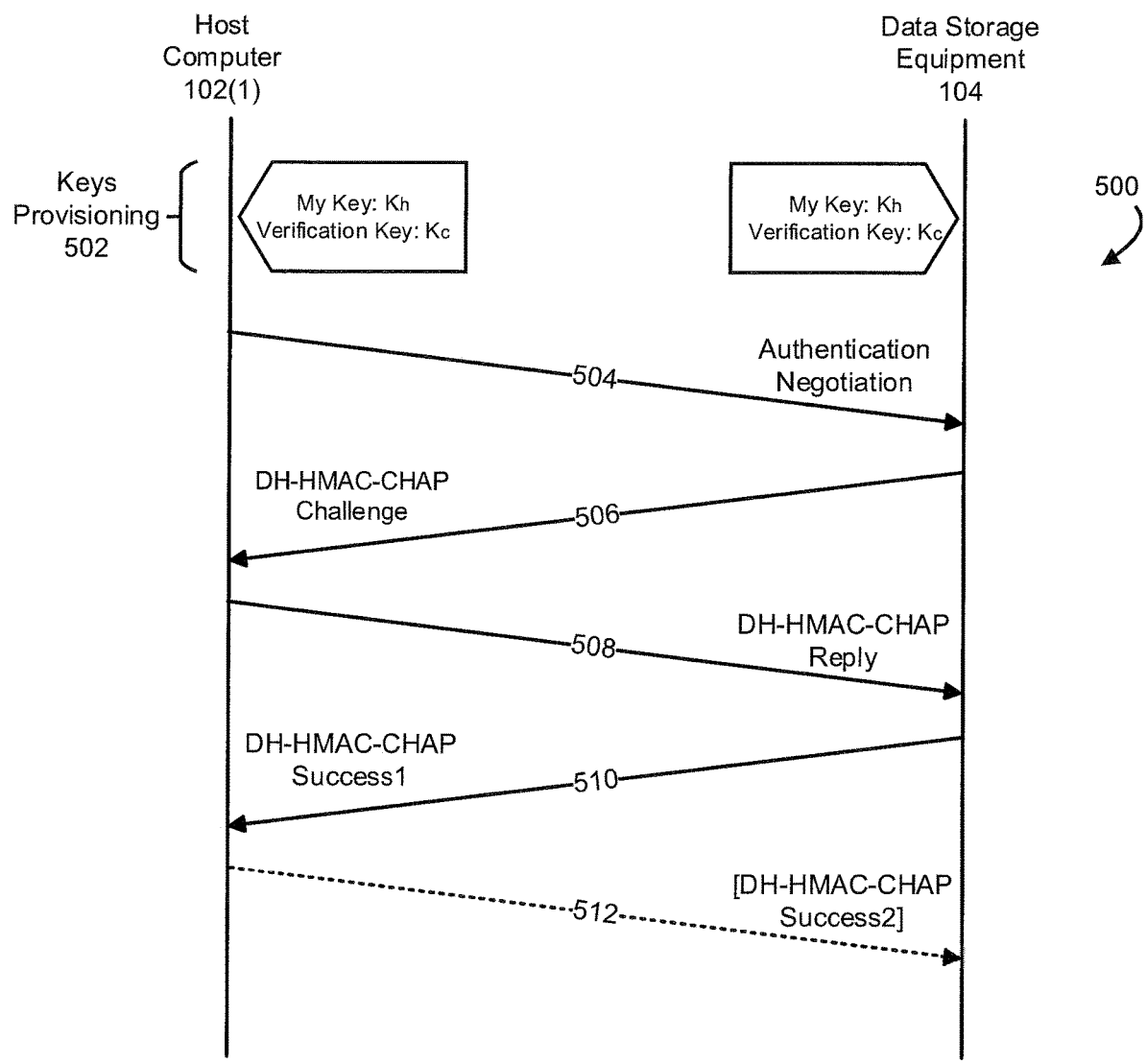
FIG. 5 shows a flowchart of a procedure to perform authentication in accordance with certain embodiments.

FIG. 5 shows a flowchart of a procedure 500 which is performed by specialized equipment in accordance with certain embodiments. The procedure 500 carries out an authentication transaction (e.g., step 408, FIG. 4) to authenticate a session between the host computer 102(1) and the data storage equipment 104 in accordance with a Diffie-Hellman-hash-based message authentication code-challenge-handshake authentication protocol (DH-HMAC-CHAP). It should be understood that DH-HMAC-CHAP is provided for example purposes, and in some embodiments, other authentication protocols are suitable (e.g., CHAP, etc.).

In some embodiments, DH-HMAC-CHAP is a shared key authentication protocol directed to establishing a trusted connection between entities. Along these lines, in some embodiments, under DH-HMAC-CHAP, an authenticator verifies a responder's identity using a set of secret keys and cryptographic algorithms to maintain communication security.

At 502, the host computer 102(1) and the data storage equipment 104 provision secret keys. Along these lines, in some embodiments, the data storage equipment 104 provisions a personal key (e.g., Kc) and a verification key (e.g., Kh) to verify the identity of the host computer 102(1). In some embodiments, the verification key (e.g., Kh) that the data storage equipment 104 uses to verify the host computer 102(1) is the personal key of the host computer 102(1). Similarly, in some embodiments, the personal key (e.g., Kc) of the data storage equipment 104 is the verification key that the host computer 102(1) uses to verify the data storage equipment 104. In some embodiments, the host computer 102(1) and the data storage equipment 104 provision respective secret keys prior to the authentication transaction (step 408).

As explained in greater detail below, in some embodiments, authentication is successful when an entity demonstrates that it knows its own key (e.g., when an authenticator verifies that a response from a responder is the same as an expected response that the authenticator calculates using the authenticator's verification key).

At 504, after provisioning secret keys, the host computer 102(1) provides negotiation information to the data storage equipment 104 to decide certain aspects of the authentication transaction. In some embodiments, the negotiation information includes initial setup information (e.g., a transaction identification, etc.).

In some embodiments, the negotiation information includes a first list of supported hash functions that the host computer 102(1) is able to use to authenticate the session. In some embodiments, upon receiving the negotiation information, the data storage equipment 104 compares the first list of supported hash functions from the host computer 102(1) with a second list of supported hash functions that the data storage equipment 104 is able to use to authenticate the session. Further, in some embodiments, the data storage equipment 104 selects a hash function to use in the authentication transaction (e.g., a hash function that is listed on both the first list of supported hash functions and the second list of supported hash functions). Example hash functions include SHA-256, SHA-384, SHA-512, etc.

In some embodiments, the negotiation information includes a first list of supported DH groups that the host computer 102(1) is able to use to authenticate the session. In some embodiments, upon receiving the negotiation information, the data storage equipment 104 compares the first list of supported DH groups from the host computer 102(1) with a second list of supported DH groups that the data storage equipment 104 is able to use to authenticate the session. Further, in some embodiments, the data storage equipment 104 selects a DH group to use in the authentication transaction (e.g., a DH group that is listed on both the first list of supported DH groups and the second list of supported DH groups). Example DH groups include Null DH, 2048-bit, 3072-bit, 4096-bit, 6144-bit, 8192-bit, etc.

At 506, the data storage equipment 104 transmits a DH-HMAC-CHAP challenge to the host computer 102(1). In some embodiments, the DH-HMAC-CHAP challenge provides challenge parameters, e.g., the selected hash function, the selected DH group, a set of public values of the authentication transaction, etc. In some embodiments, the set of public values includes a modulus value (e.g., p) and a base value (e.g., g). In some embodiments, upon receiving the challenge parameters, the host computer 102(1) performs calculations using its own secret key (Kh) and the challenge parameters to generate a response to the challenge.

At 508, the host computer 102(1) transmits the response to the data storage equipment 104. Optionally, in some embodiments, the host computer 102(1) transmits its own authentication challenge (i.e., a second challenge).

In some embodiments, after receiving the response, the data storage equipment 104 the data storage equipment 104 compares the response from the host computer 102(1) to an expected response. In some embodiments, the data storage equipment 104 performs calculations using its verification key (Kh) and the challenge parameters to generate the expected response. If the response matches the expected response, the authentication is successful and the procedure 500 proceeds to 510. Further, if the host computer 102(1) transmitted the second challenge, then the data storage equipment 104 calculates a response to the second challenge.

At 510, the data storage equipment 104 transmits a notification to the host computer 102(1) to indicate that the authentication was successful. In some embodiments, if the host computer transmitted the second challenge, data storage equipment 104 also transmits the response to the second challenge. In some embodiments, the host computer 102(1) calculates an expected response to the second challenge and compares it to the response from the data storage equipment 104. If the response matches the expected response, the procedure 500 proceeds to 512.

At 512, the host computer 102 transmits a notification to the host computer 102(1) to indicate that authentication was successful. Accordingly, the trusted connection between the host computer 102(1) and the data storage equipment 102 is established.

As described above, improved techniques are directed to managing connection security of a storage array when receiving an instruction to implement an updated security requirement. In some arrangements, the storage array is configured with multiple user-selectable capabilities that address different security and/or connectivity concerns. Along these lines, if an active session between the storage array and a host device is unable to satisfy the updated security requirement, the storage array applies one of the capabilities based on a user selection. Under one capability, the storage array implements the updated security requirement and terminates the active session. Under another capability, the storage array implements the updated security requirement while maintaining the active session. Under yet another capability, the storage array declines to implement the updated security requirement. Accordingly, the user maintains control over security of the storage array and connections with the storage array.

One should appreciate that the above-described techniques do not merely collect and store data. Rather, the disclosed techniques include provisioning a storage array with multiple capabilities and applying one of the capabilities to manage connection security of the storage array. Accordingly, such techniques enable the storage array to flexibly manage connection security.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 100 such as the data storage equipment 104, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

Some embodiments are directed to strengthening a security framework around NVMe/TCP. Hardening security is even more important because of growing concerns about breaches and hacks. Security has become a key tenant for customers and is often non-negotiable.

NVMe-oF in-band authentication was added recently to NVMe 2.0 (Technical Proposal 8006 (TP-8006)), coming to the game while there are already deployments in the field, which do not use authentication.

Some embodiments are directed to adding an ability of authentication to a product that is already installed and has existing non-authenticated connectivity (e.g., active sessions from hosts running I/Os). This raises a concern about how to introduce authentication, which, on the one hand, will adhere to a security policy and, on the other hand, will not be disruptive and cause hosts to disconnect from the storage.

To enable NVMe authentication between NVMe entities (e.g., an NVMe subsystem (storage system) and an NVMe host), NVMe specifications define (at TP-8025) a consistent way to express security protocol configurations of the NVMe entities.

Some embodiments define the following configuration attributes:
Attributes configured as System Global Attributes per all connections or as a profile per group of connections):
Authentication Policy:
Authentication disabled-Authentication of a remote entity not allowed
Authentication permitted-Authentication of a remote entity allowed
Authentication required-Authentication of a remote entity required
Allowed Hashes:
List of allowed hashes that the NVMe Subsystem declares it supports.
This list contains the hash functions that the array supports (e.g., from a list defined in NVMe documentation).
Examples: SHA-256, SHA-384, SHA-512, etc.
In some embodiments, at the negotiation phase, a list matched with hashes supported by the host appears in the negotiation message and the storage array chooses one supported by both.
Allowed DH Groups:
List of allowed Diffie-Hellman Groups that the NVMe Subsystem declares it supports.
This list contains the DH groups that the array supports (e.g., from the list defined at NVMe Spec)
Example: [Null DH, 2048-bit, 3072-bit, 4096-bit, 6144-bit, 8192-bit]
In some embodiments, at the negotiation phase, the list matched with DH groups supported by the host appears in the negotiation message and the storage array chooses one supported by both.
Secret Configuration
In some embodiments, each NVMe entity is able to be provisioned with its own DH-HMAC-CHAP secret and with a verification secret per each remote entity that can be authenticated.
In some embodiments, the storage system supports a configuration of secrets as defined at the NVMe Spec per NVMe host
subsystem_authentication_secret-own (the NVMe subsystem/storage array) DH-HMAC-CHAP secret
nvme_host_authentication_secret-verification secret of the NVMe host
In some embodiments, a DH-HMAC-CHAP secret is represented as: DHHC-1: xx: <Base64 encoded string>:
In some embodiments, NVMe host systems supporting NVMe authentication support a similar configuration.

Introducing NVMe authentication to already deployed systems with active connections between the host and the storage array, which were not authenticated, raises the question of how to apply NVMe authentication on in-use connections.

In some embodiments, a default authentication policy is defined as "Permitted" to allow a gradual transition to authentication, to enable authentication with host systems that support authentication but to not enforce authentication on hosts that do not.

Some embodiments are directed to what should be the behavior any time a security configuration change is made that causes active/in-use sessions to become non-compliant with the NVMe Authentication configuration. For example, should the non-complying in-use sessions be disconnected to adhere to the Security configuration, or should they be kept to prevent unplanned disconnection?

In some embodiments, the following configuration examples are conflicts between a security configuration and active sessions:
Authentication policy modification
When the policy is set to "Required" and there are non-authenticated sessions.
allowed_hashes/allowed_dh_groups modification
Removal of a hash from "allowed hashes" or DH group from "allowed DH groups" and existing authenticated sessions use the removed options
Secrets modification/deletion
When a secret(s) is modified or deleted, and there are authenticated sessions.

Conventional approach does not disconnect existing sessions, even when they do not comply with a new security configuration. Under the conventional approach, a change takes effect only when the host tries to re-login.

Problems with this approach include:
It violates security configuration-if the admin would like to harden the system and require only authenticated connections, keeping unauthenticated connections violates this configuration.
There is no way to gain back security, as the conventional approach keeps the existing connection, and even though the admin decided to secure the system, there is no way to disconnect a malicious host.
Delaying the application of policy/configuration changes can lead the user to unexpected issues due to misconfiguration in the future (for example, after a host reboot).
It gives the user a false "sense of security" in at least two ways:
Some connections are less secure than the user thought she configured them. Maybe a rogue host was already connected, and it remains connected, though the user wanted authentication to block rogue hosts.
The user thinks it configured all her hosts correctly, when in fact, she might have a host misconfigured (e.g., missing secrets) and might discover the error days later when she does an unrelated operation (reboots the host or has networking disconnection) which results in DU.
Enables malicious host to connect to a system:
If all queues of some controller should have the same security level (all authenticated or all unauthenticated), and if the admin keeps an un-authenticated controller up when the admin asks for authentication, then a malicious host can add an IO queue to the existing unauthenticated controller, thus bypassing the security code.
Similarly, malicious hosts can wait for disconnection of some unauthenticated IO queue or proactively work to disconnect and reconnect w/o authentication.
A malicious host can proactively work to disconnect an IO queue
It is not flexible for the user
The user cannot choose to be pedantic on security or to favor connectivity.
The user has no visibility if the new configuration causes any conflict and has no option to decide whether the configuration should succeed only if there is no conflict.

The user cannot gain back security—there is no way to disconnect a malicious host.

In contrast to the conventional approach, improved techniques are directed to a user-configurable policy to define whether to keep or disconnect the non-compliant sessions. Some embodiments support configuration of an "active_session_policy" (e.g., an attribute that defines the policy when a security configuration change causes one or more in-use sessions to become non-compliant with the security configuration.

In some embodiments, active_session_policy options include:
  Keep—The new security configuration will succeed, and any existing session that is not compliant with the new configuration will be kept (not disconnected)
  Disconnect—The configuration will succeed, and any existing session that is not compliant with the new security configuration will be disconnected
  Fail—The configuration will fail if a session is not compliant with the new security configuration. The non-compliant session will not be disconnected Some embodiments move away from fixed policy. That is, some embodiments have defined a unique configuration attribute that can answer both security and stability, which can fit different users and types of administrative procedures.

A significant advantage of some embodiments is that at any point in time, the user can gain back security by changing the setting of the active_session_policy, even if initially she chose to keep conflicting sessions—there is always a way to disconnect a malicious host.

In some embodiments, authentication configuration attributes include:
  nvme_authentication_policy
    Disabled—authentication transaction is disabled by the NVMe subsystem.
      Subsystem controller indicates authentication not required (e.g., at AUTHREQ field in the connect response)
      If hosts initiate an authentication transaction, the connection will be disconnected
    Permitted—authentication transaction is allowed by the NVMe subsystem.
      Subsystem controller indicates authentication not required (e.g., at AUTHREQ field in the connect response).
      The host is allowed to initiate an authentication transaction; the authentication transaction will proceed
      In some embodiments, this state provides a gradual transition to authentication
    Required—authentication transaction is required by the NVMe subsystem.
      Subsystem controller indicates authentication required (e.g., at AUTHREQ field in the Connect response)
      In some embodiments, NVMe in-band authentication is performed before the queues may be used to perform other fabrics commands, admin commands, and/or I/O commands.
      In some embodiments, if hosts do not initiate an authentication transaction, then a controller aborts all commands received on that queue other than authentication commands with a status code of Authentication Required.
  allowed_hashes
    List of allowed hash functions by the storage array. In some embodiments, the storage array supports the mandatory hashes as defined at the NVMe specification (TP-8006)
  allowed_dh_groups
    List of allowed DH groups by the storage array. In some embodiments, the storage array supports the mandatory DH groups as defined at the NVMe specification (TP-8006)
  Host/Subsystem Secret
    In some embodiments, a format of secrets follows NVMe specifications
    Refer to NVMe spec 2.0-2.3.4. DH-HMAC-CHAP Key
    In some embodiments, a DH-HMAC-CHAP secret is represented as: DHHC-1: xx: <Base64 encoded string>:
    Where:
      "DHHC-1" indicates this is a version 1 representation of a secret for the DH-HMAC-CHAP protocol
      ":" is used both as a separator and a terminator
      xx-indicates HMAC hash for key transformation (e.g., the two ASCII characters "01" indicate SHA-256). The two ASCII characters "00" indicate no transform, i.e., use the secret as a key
      The Base64 string encodes the key (32, 48, or 64 bytes) followed by the CRC-32 of the key (4 bytes).
      For example, in some embodiments, the 32-byte secret "89AEB31A 874EAF84 841B4673 6B0DFDF2 BA58D30A A2 Å545A3 E235A352 1E07594Ch" is represented as: DHHC-1:00: ia6zGodOr4SEG0Zzaw398rpY0wqipUWj4j WjUh4HWUz6aQ2n:.

Some embodiments proceed as described below. It should be understood that the following scenarios are provide for example purposes.

Scenario #1: If Authentication_Policy is set to "Required" and non-authenticated sessions exist:
  If active_session_policy is "Fail"
    If there are non-authenticated sessions-reject configuration
  If active_session_policy is "Keep"
    Accept configuration
    Warn the user that non-authenticated sessions will be kept and ask him whether to cancel or continue.
    Keep non-authenticated sessions.
  If active_session_policy is "Disconnect"
    Accept configuration
    Warn the user that non-authenticated sessions will be disconnected (depending on policy setting)" and ask him whether to cancel or continue.
    Disconnect non-authenticated sessions Scenario #2: If HashID is removed from "allowed_hashes," or DHgID is removed from "allowed_dh_groups":
  If active_session_policy is "Fail"
    If there are authenticated sessions using removed HashID or DHgID-reject the configuration
  If active_session_policy is "Keep"
    Accept configuration
    Warn the user that Authenticated sessions using removed HashID/DHgID will be kept and ask him whether to cancel or continue.

Keep authenticated sessions using removed HashID/DHgID.
If active_session_policy is "Disconnect"
Accept configuration
Warn the user that Authenticated sessions using removed HashID/DHgID will be disconnected and ask him whether to cancel or continue.
Disconnect authenticated sessions using removed HashID/DHgID.
Scenario #3: If NVMe Secrets modified\deleted:
If active_session_policy is "Fail"
If there are authenticated sessions-reject the configuration
If active_session_policy is "Keep"
Accept configuration
Warn the user that authenticated sessions will be kept and ask him whether to cancel or continue.
Keep authenticated sessions using old secrets.
If active_session_policy is "Disconnect"
Accept the configuration
Warn the user that authenticated sessions will be and ask him whether to cancel or continue.
Disconnect authenticated sessions using old secrets.
Scenario #4: The following scenario is not considered a conflict: If Authentication Policy is set to "Disabled", although there might be authenticated sessions, such configuration will not be considered a conflict and shall be accepted. In this case, the active_session_policy has no effect on existing sessions. Post an info message to the user: "Authenticated sessions will be kept."

In some embodiments, when setting to "Disabled", there is no security reason to stop the session when the policy becomes less secure. Most likely will be used for troubleshooting and testing, and unlikely the user would like to disconnect authenticated sessions.

Some embodiments proceed as described below to "gain back" security. It should be understood that the following scenarios are provide for example purposes.

Scenario #1: If Authentication_Policy is set to "Required" and non-authenticated sessions exist and user sets active_session_policy as "keep"-non-authenticated sessions will be kept.
How to gain back security:
User should set auth_policy=required again with active_session_policy=disconnect.
User can set auth_policy=allowed, and then set auth_policy=required with active_session_policy=disconnect.

Scenario #2: If NVMe secrets are modified/deleted, an authenticated session (with those secrets) exists, and a user set active_session_policy is "keep"-authenticated sessions with old secrets will be kept.
How to gain back security:
User should set the same new secrets again with active_session_policy=disconnect.
User can set some other secrets with active_session_policy=keep and then set the new secrets again with active_session_policy=disconnect.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing connection security of a storage array, the method comprising:
provisioning the storage array with capabilities to:
(i) implement an updated security requirement and terminate an active session between the storage array and a host device in response to the active session being unable to satisfy the updated security requirement,
(ii) implement the updated security requirement and maintain the active session even though the active session is unable to satisfy the updated security requirement, and
(iii) decline implementing the updated security requirement and maintain the active session in response to the active session being unable to satisfy the updated security requirement;
after the storage array has been provisioned with the capabilities, receiving a security policy selection which identifies one of the capabilities; and
applying one of the capabilities to the storage array based on the security policy selection.

2. The method of claim 1, further comprising:
receiving an instruction to implement the updated security requirement, the instruction providing a set of authentication parameters to authenticate new sessions of the storage array; and
after receiving the instruction to implement the updated security requirement, performing a compliance operation that indicates whether the active session was authenticated in compliance with the set of authentication parameters; and
wherein applying one of the capabilities is in response to the compliance operation indicating that the active session was not authenticated in compliance with the set of authentication parameters.

3. The method of claim 2 wherein the set of authentication parameters includes a set of hash functions to perform authentication according to a hash-based message authentication protocol; and
wherein performing the compliance operation includes:
confirming whether the host device supports authentication according to the hash-based message authentication protocol using at least one hash function from the set of hash functions.

4. The method of claim 2 wherein the set of authentication parameters includes a set of Diffie-Hellman (DH) groups to perform authentication according to a DH-hash-based message authentication code-challenge-handshake authentication protocol (DH-HMAC-CHAP); and
wherein performing the compliance operation includes:
confirming whether the host device supports authentication according to the DH-HMAC-CHAP using at least one DH group from the set of DH groups.

5. The method of claim 2, wherein receiving the instruction to implement the updated security requirement includes receiving an instruction to modify an existing secret key that was used to authorize the active session.

6. The method of claim 2, wherein receiving the instruction to implement the updated security requirement includes:
after the storage array has established the active session with the host device, receiving an instruction to modify an authentication policy of the storage array to require authentication of new sessions with the storage array.

7. The method of claim 1 wherein applying one of the capabilities includes:
   applying a particular capability in which the storage array implements the updated security requirement while maintaining the active session; and
   wherein the method further comprises:
      after applying the first capability, receiving an updated security policy selection that identifies another capability in which the storage array is configured to terminate the active session for failing to comply with the updated security requirement; and
      in response to receiving the updated security policy selection, terminating the active session for failing to comply with the updated security requirement.

8. The method of claim 1 wherein receiving the security policy selection includes:
   receiving, as the security policy selection, a default selection in which the storage array implements the updated security requirement and terminates the active session in response to the active session being unable to satisfy the updated security requirement.

9. The method of claim 1, further comprising:
   after receiving the security policy selection, providing a graphical interface constructed and arranged to identify the active session as being unable to satisfy the updated security requirement; and
   after providing the graphical interface, receiving a confirmation to proceed with applying one of the capabilities based on the security policy selection.

10. An electronic environment, comprising:
    a storage array;
    memory; and
    control circuitry coupled with the memory, the memory storing instructions that, when carried out by the control circuitry, cause the control circuitry to perform a method of managing connection security of the storage array, the method including:
       provisioning the storage array with capabilities to:
       (i) implement an updated security requirement and terminate an active session between the storage array and a host device in response to the active session being unable to satisfy the updated security requirement,
       (ii) implement the updated security requirement and maintain the active session even though the active session is unable to satisfy the updated security requirement, and
       (iii) decline implementing the updated security requirement and maintain the active session in response to the active session being unable to satisfy the updated security requirement;
       after the storage array has been provisioned with the capabilities, receiving a security policy selection which identifies one of the capabilities; and
       applying one of the capabilities to the storage array based on the security policy selection.

11. The electronic environment of claim 10, wherein the method further includes:
    receiving an instruction to implement the updated security requirement, the instruction providing a set of authentication parameters to authenticate new sessions of the storage array; and
    after receiving the instruction to implement the updated security requirement, performing a compliance operation that indicates whether the active session was authenticated in compliance with the set of authentication parameters; and
    wherein applying one of the capabilities is in response to the compliance operation indicating that the active session was not authenticated in compliance with the set of authentication parameters.

12. The electronic environment of claim 11 wherein the set of authentication parameters includes a set of hash functions to perform authentication according to a hash-based message authentication protocol; and
    wherein performing the compliance operation includes:
       confirming whether the host device supports authentication according to the hash-based message authentication protocol using at least one hash function from the set of hash functions.

13. The electronic environment of claim 11 wherein the set of authentication parameters includes a set of Diffie-Hellman (DH) groups to perform authentication according to a DH-hash-based message authentication code-challenge-handshake authentication protocol (DH-HMAC-CHAP); and
    wherein performing the compliance operation includes:
       confirming whether the host device supports authentication according to the DH-HMAC-CHAP using at least one DH group from the set of DH groups.

14. The electronic environment of claim 11, wherein receiving the instruction to implement the updated security requirement includes receiving an instruction to modify an existing secret key that was used to authorize the active session.

15. The electronic environment of claim 11, wherein receiving the instruction to implement the updated security requirement includes:
    after the storage array has established the active session with the host device, receiving an instruction to modify an authentication policy of the storage array to require authentication of new sessions with the storage array.

16. The electronic environment of claim 10, wherein applying one of the capabilities includes:
    applying a particular capability in which the storage array implements the updated security requirement while maintaining the active session; and
    wherein the method further comprises:
       after applying the first capability, receiving an updated security policy selection that identifies another capability in which the storage array is configured to terminate the active session for failing to comply with the updated security requirement; and
       in response to receiving the updated security policy selection, terminating the active session for failing to comply with the updated security requirement.

17. The electronic environment of claim 10 wherein receiving the security policy selection includes:
    receiving, as the security policy selection, a default selection in which the storage array implements the updated security requirement and terminates the active session in response to the active session being unable to satisfy the updated security requirement.

18. The electronic environment of claim 10, wherein the method further includes:
    after receiving the security policy selection, providing a graphical interface constructed and arranged to identify the active session as being unable to satisfy the updated security requirement; and
    after providing the graphical interface, receiving a confirmation to proceed with applying one of the capabilities based on the security policy selection.

19. A computer program product having a non-transitory computer readable medium that stores a set of instructions to manage connection security of a storage array, the set of instructions, when carried out by computerized circuitry, causes the computerized circuitry to perform a method of:
provisioning the storage array with capabilities to:
(i) implement an updated security requirement and terminate an active session between the storage array and a host device in response to the active session being unable to satisfy the updated security requirement,
(ii) implement the updated security requirement and maintain the active session even though the active session is unable to satisfy the updated security requirement, and
(iii) decline implementing the updated security requirement and maintain the active session in response to the active session being unable to satisfy the updated security requirement;
after the storage array has been provisioned with the capabilities, receiving a security policy selection which identifies one of the capabilities; and
applying one of the capabilities to the storage array based on the security policy selection.

* * * * *